United States Patent
Iovanna et al.

(10) Patent No.: US 10,667,024 B2
(45) Date of Patent: May 26, 2020

(54) TRANSPORT NETWORK AND METHOD

(71) Applicant: Telefonaktiebolaget LM Ericsson (publ), Stockholm (SE)

(72) Inventors: Paola Iovanna, Pisa (IT); Francesco Testa, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/578,663

(22) PCT Filed: Jun. 2, 2015

(86) PCT No.: PCT/EP2015/062306
§ 371 (c)(1),
(2) Date: Nov. 30, 2017

(87) PCT Pub. No.: WO2016/192784
PCT Pub. Date: Dec. 8, 2016

(65) Prior Publication Data
US 2018/0220209 A1    Aug. 2, 2018

(51) Int. Cl.
*H04Q 11/00* (2006.01)
*H04J 14/02* (2006.01)
*H04B 10/2575* (2013.01)

(52) U.S. Cl.
CPC ... *H04Q 11/0062* (2013.01); *H04B 10/25755* (2013.01); *H04J 14/022* (2013.01); *H04J 14/0216* (2013.01); *H04J 14/0283* (2013.01); *H04J 14/0291* (2013.01); *H04J 14/0297* (2013.01); *H04Q 2011/0081* (2013.01); *H04Q 2011/0092* (2013.01)

(58) Field of Classification Search
CPC .............................................. H04Q 2011/0092
See application file for complete search history.

(56) References Cited

U.S. PATENT DOCUMENTS

| | | | |
|---|---|---|---|
| 6,272,154 B1* | 8/2001 | Bala | H04J 14/0206 14/206 |
| 6,579,018 B1* | 6/2003 | Li | H04J 14/0212 398/4 |
| 7,072,584 B1 | 7/2006 | Lichtman et al. | |
| 2002/0181044 A1* | 12/2002 | Kuykendall, Jr. | G02B 5/32 398/70 |

(Continued)

FOREIGN PATENT DOCUMENTS

WO    2016005008 A1    1/2016

OTHER PUBLICATIONS

International Search Report and Written Opinion for Application No. PCT/EP2015/062306, dated Feb. 24, 2016, 8 pages.

*Primary Examiner* — Nathan M Cors
(74) *Attorney, Agent, or Firm* — Patent Portfolio Builders, PLLC

(57) ABSTRACT

A transport network is configured to connect one or more optical rings of optical add and drop devices with one or more digital units in a radio access network. The transport network comprises a first electronic cross-connect and a second electronic cross-connect. A switch is provided for connecting the first electronic cross-connect and/or the second electronic cross-connect to the one or more digital units. The first and second electronic cross-connects are each coupled to at least one of the one or more optical rings of optical add and drop devices.

12 Claims, 6 Drawing Sheets

(56) References Cited

U.S. PATENT DOCUMENTS

| | | | | |
|---|---|---|---|---|
| 2003/0041208 A1* | 2/2003 | Volkmar | ............... | H04L 49/552 710/316 |
| 2005/0084263 A1* | 4/2005 | Norman | .............. | H04J 14/0293 398/19 |
| 2014/0105600 A1* | 4/2014 | Dahlfort | ............. | H04J 14/0204 14/204 |

* cited by examiner

TRANSPORT NETWORK AND METHOD

CROSS-REFERENCE TO RELATED APPLICATIONS

This application is a National stage of International Application No. PCT/EP2015/062306, filed Jun. 2, 2015, which is hereby incorporated by reference.

TECHNICAL FIELD

The present disclosure relates to a transport network and method, and for example, a transport network to connect one or more optical rings of optical add and drop devices (for example connected to remote radio units) with one or more digital units in a radio access network.

BACKGROUND

In radio transport networks a number of different technologies may be used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio transport network comprises Radio Base Stations (RBS) providing radio coverage over at least one respective geographical area forming a cell. The cell definition may also incorporate frequency bands used for transmissions, which means that two different cells may cover the same geographical area but using different frequency bands. User equipments (UEs) are served in the cells by the respective radio base station and are communicating with a respective radio base station. The user equipments transmit data over an air or radio interface to the radio base stations in uplink (UL) transmissions and the radio base stations transmit data over an air or radio interface to the user equipments in downlink (DL) transmissions.

In some RBS implementations a radio unit and a baseband processing equipment (digital unit (DU)) of the RBS are separated. In some examples, the radio unit and baseband processing equipment is split in two different locations.

In this case, the radio unit is remote and termed a remote radio unit (RRU). As such, the system separates a RBS into one or more DUs and RRUs.

The DUs and RRUs are connected, for example, via a transport network, such as an optical transport network. The one or more DUs may be centralized and located remotely, for example a few kilometers from the RRUs. The RRUs are placed close to the radio antennas, e.g. in antenna masts. This minimizes feeder and jumper losses between antenna and RRUs, which is often a major challenge to address in most radio transport networks, for example, to enhance the uplink capacity of mobile services.

Centralized radio access network (RAN) is based on the DU and signal processing centralization, which offers processing resources for multiple cells, each covered by an antenna driven by a RRU. This allows a pool of processing resources to be dynamically shared among many cells, in line with the cloud computing principle, saving energy, improving the radio link reliability and decreasing the number and size of access sites. Centralized DU processing can therefore help reduce the cost of the infrastructure and favor coordination among different RRU pools.

In systems such as Long Term Evolution (LTE) and LTE Advanced (LTE-A), where coordinated processing is beneficial to performance improvements, the capability to manage this centrally rather than via an external X2 interface between base stations could generate important performance gains.

In addition, coordinated processing can be beneficial to reduce and manage inter-cell interference between neighboring cells and across access layers in heterogeneous networks where small cells are used to offload part of the traffic originally handled by a macro cell. Here, coordination is needed to avoid interference and to enable frequency reuse among macro and small cells.

In some examples, the interface between the DUs and RRUs is an optical Non-Return to Zero (NRZ) signal, which is a sampled In-phase Quadrature (I/Q) air interface waveform. Sampling the air waveform makes the remote radio unit implementation relatively simple but leads to very high bitrates of the optical signal, in the order of 1.25 Gbps per antenna.

A Common Public Radio Interface (CPRI) specifies a Time Division Multiplexing (TDM) like protocol for RBS configurations in a system configured for RRUs and DUs over a first layer. CPRI defines a protocol which can be used to connect a DU and RRU. The application of CPRI between the DUs and the RRUs may be static, i.e. determined as the RBS is deployed, and in such an example the CPRI configuration is typically only changed as part of a predetermined topology involving the DUs and RRUs.

CPRI requires accurate synchronization and latency control. Even if conventional CPRI transport is normally operated on fiber using point-to-point optical connections between DU and RRU distances of less than a few hundreds of meters, there is a demand to extend its reach over geographical distances.

Traditional dedicated point-to-point links established between a limited number of DU ports and associated RRUs is inadequate to meet these new extended distance requirements. For example, the requirements of new installed fibers would be not sustainable as soon as the distances between RRUs and associated DUs became longer than a few kilometers.

Moreover, an increase of the optimization level could be achieved by having a pool of DUs serving a plurality of RRUs. This allows a wider geographical area, enabling a higher optimization of computational resources. The use of a pool of DUs should deal with at least the following issues:
  CPRI has tight requirements and constrains (e.g. latency, jitter, symmetry). A transport and switching solution should therefore comply with them;
  Efficient load balancing and failure recovery requires the ability to change which DU(s) is handling an RRU, possibly without traffic disruption;
  A consistent reduction of infrastructure cost requires optimizing the geographical cabling which supports the connectivity among RRUs and DUs.

A transport network for providing connectivity among RRU clusters and a DU pool, as described above, is sometimes referred to as a front haul (FH) network. FH networks may use WDM (Wavelength Division Multiplexing) networking solutions, for example using an optical ring topology. The use of a FH network should not impact the quality of service of a radio network, and thus in the case of a failure, the FH network should be recovered without impacting on the radio service. In addition, the FH network should preferably provide support for differentiated classes of services.

SUMMARY

According to a first aspect, there is provided a transport network configured to connect one or more optical rings of optical add and drop devices with one or more digital units in a radio access network. The transport network comprises a first electronic cross-connect and a second electronic cross-connect, and a switch for connecting the first electronic cross-connect and/or the second electronic cross-connect to the one or more digital units. The first and second electronic cross-connects are each coupled to at least one of the one or more optical rings of optical add and drop devices.

According to another aspect, there is provided a method of operating a transport network configured to connect one or more optical rings of optical add and drop devices with one or more digital units in a radio access network. The method comprises providing a first electronic cross-connect for connecting the one or more digital units to the one or more optical rings, and providing a second electronic cross-connect for connecting the one or more digital units to the one or more optical rings. The method comprises connecting the first electronic cross-connect and/or the second electronic cross-connect to the digital units during a first mode, and disconnecting the first electronic cross-connect from the digital units, and connecting the second electronic cross-connect to the digital units during a second mode.

DETAILED DESCRIPTION

The embodiments described herein relate to a method and related architecture for a transport network, and in particular a method and related architecture for providing failure recovery in a transport network connecting one or more digital units (DUs, e.g. a pool of DUs) with one or more remote radio unit (RRU) clusters.

Figure 1:
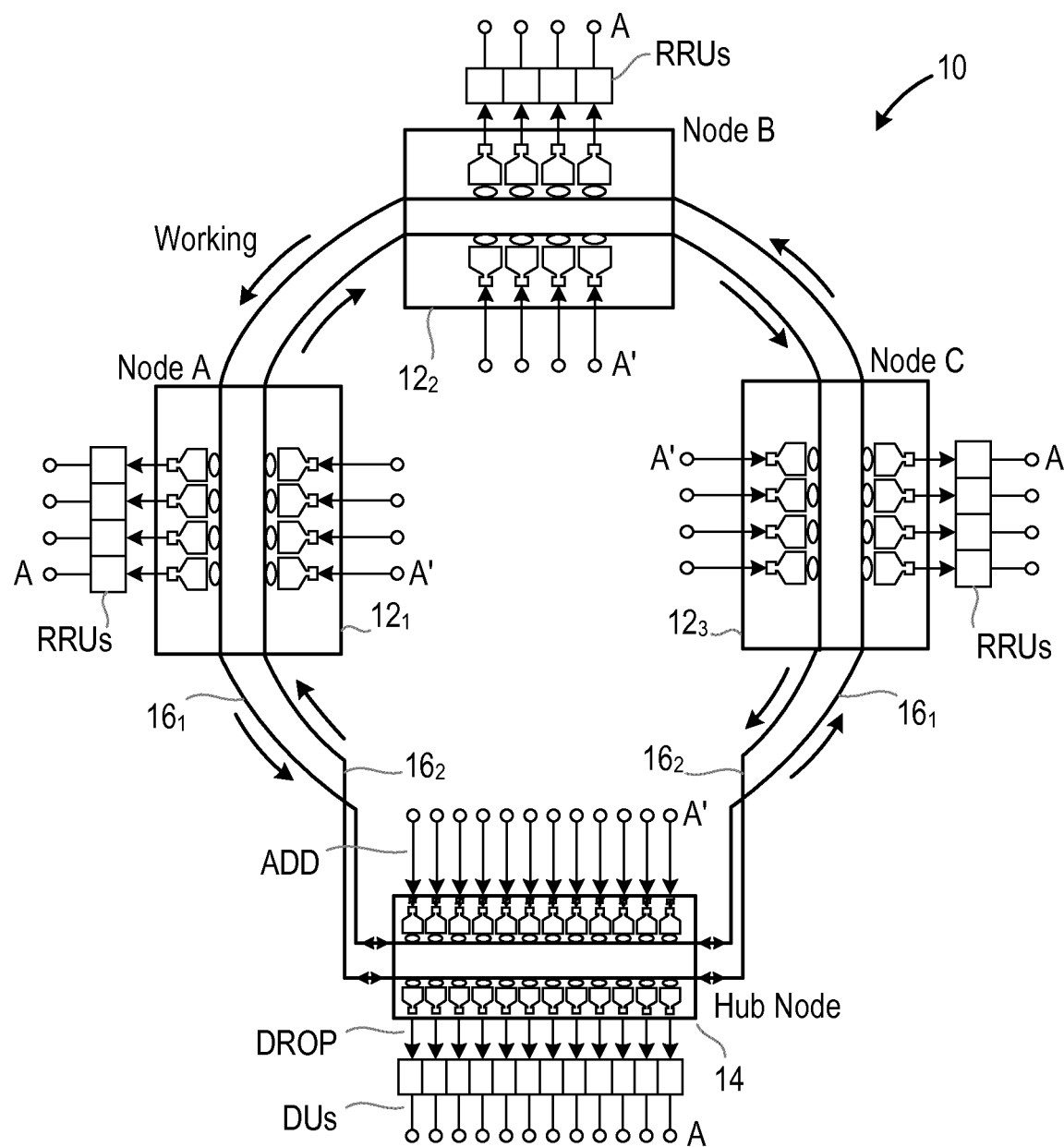
FIG. 1 shows an example of clusters of remote radio units (RRUs) connected in a ring topology network to a hub node with a DU pool.

FIG. 1 illustrates an example of an optical ring network 10 interconnecting three optical add and drop devices $12_1$ to $12_3$ (each connected for example to a respective cluster of one or more RRUs) to a multiplexer/demultiplexer 14 in a hub node. The multiplexer/demultiplexer may be a Wavelength Division multiplexer/demultiplexer. In this example, the optical ring network 10 is performing in working conditions. In this example, the ring network 10 is provided in a double ring formation, for example a Wavelength Division Multiplexing (WDM) double ring network.

The three optical add and drop devices $12_1$ to $12_3$ are coupled to the WDM Multiplexer/demultiplexer 14 by two paths $16_1$, $16_2$ of the double ring network. The direction of signals on each optical path $16_1$, $16_2$ is indicated by the arrows.

In this example, the RRU clusters are connected to optical add and drop devices $12_1$ to $12_3$ that may be Reconfigurable Optical Add Drop Multiplexers, ROADMs or fixed optical add and drop multiplexers. Each ROADM may be configured to add/drop a sub-set of local wavelength signals. In this example each ROADM is configured to add/drop four wavelengths of the twelve wavelengths being handled by the WDM Multiplexer/demultiplexer 14 of the hub node. It is noted that the WDM Multiplexer/demultiplexer 14 and each ROADM $12_1$ to $12_3$ may comprise a different number of wavelengths.

The optical add and drop devices $12_1$ to $12_3$, 14 attached to the optical ring may be considered as having one or more drop ports A and one or more add ports A'. In this example, each optical add and drop devices $12_1$ to $12_3$, 14 comprises a plurality of add and drop ports A,A'. Each add and drop ports A,A' is configured to add or drop a wavelength (lambda) to a connected WDM optical ring. The drop and add ports A,A' of the optical add and drop devices $12_1$ to $12_3$ provide for optical channels carrying data to be dropped from the optical ring to a RRU, or added to the optical ring from a RRU. The optical add and drop device 14 in the hub and providing a connection to the optical ring for the DUs correspondingly comprises drop and add ports A,A' to provide for optical channels carrying data to be dropped from the optical ring to a DU, or added to the optical ring from a DU. The illustration in FIGS. 1 and 2 of the RRUs adjacent to the add/drop ports is only shown for simplicity, the arrangement is for the add and drop ports A',A to be configured to be connected to one or more of the RRUs for communication of data over the network.

It is also noted that a ROADM $12_1$ to $12_3$ being used may be the same as a WDM Multiplexer/demultiplexer 14, in which case the WDM Multiplexer/demultiplexer is underutilized when used as a ROADM $12_1$ to $12_3$. In this example the downstream data (i.e. data being dropped by a ROADM) will travel in an anti-clockwise direction on a first ring, for example, the outer ring $16_1$ The upstream data (i.e. data being added by a ROADM) will travel in a clockwise direction on a second ring, for example, the inner ring $16_2$. The optical add and drop devices $12_1$ to $12_3$ can extract their respective local wavelength signals from the downstream data by means of the drop ports coupled to the outer ring $16_1$ as shown. In a similar manner, each optical add and drop device $12_1$ to $12_3$ can then also add its upstream local wavelength signals by means of the ADD ports coupled to the inner ring $16_2$ for the upstream signals. The WDM Multiplexer/demultiplexer 14 may be coupled to a pool of DUs, and comprises its own add/drop ports.

References to inner and outer rings is for illustration only. Aspects are applicable to rings which do not have a recognized inner or outer ring, or which have a normal working mode in the other of the ring described. The examples of outer and inner ring may be replaced by first and second rings, respectively.

The RRUs and DUs are connected by the first and second optical rings. The optical add and drop functionality of the Multiplexer/demultiplexers $12_1$ to $12_3$, 14, provides for a connection between the RRUs and DUs and the first and second optical rings. The one or more lambdas (wavelengths) added or dropped by the Multiplexer/demultiplexers $12_1$ to $12_3$, 14 may be from/to one or more RRUs or DUs. Examples are not limited to one wavelength per RRU or DU; one wavelength may carry data for a plurality of RRUs or DUs, or a particular RRU or DU may receive data one more than one wavelength. In some examples, the DUs may function as a single (virtualized) DU pool or baseband hotel.

Figure 2:
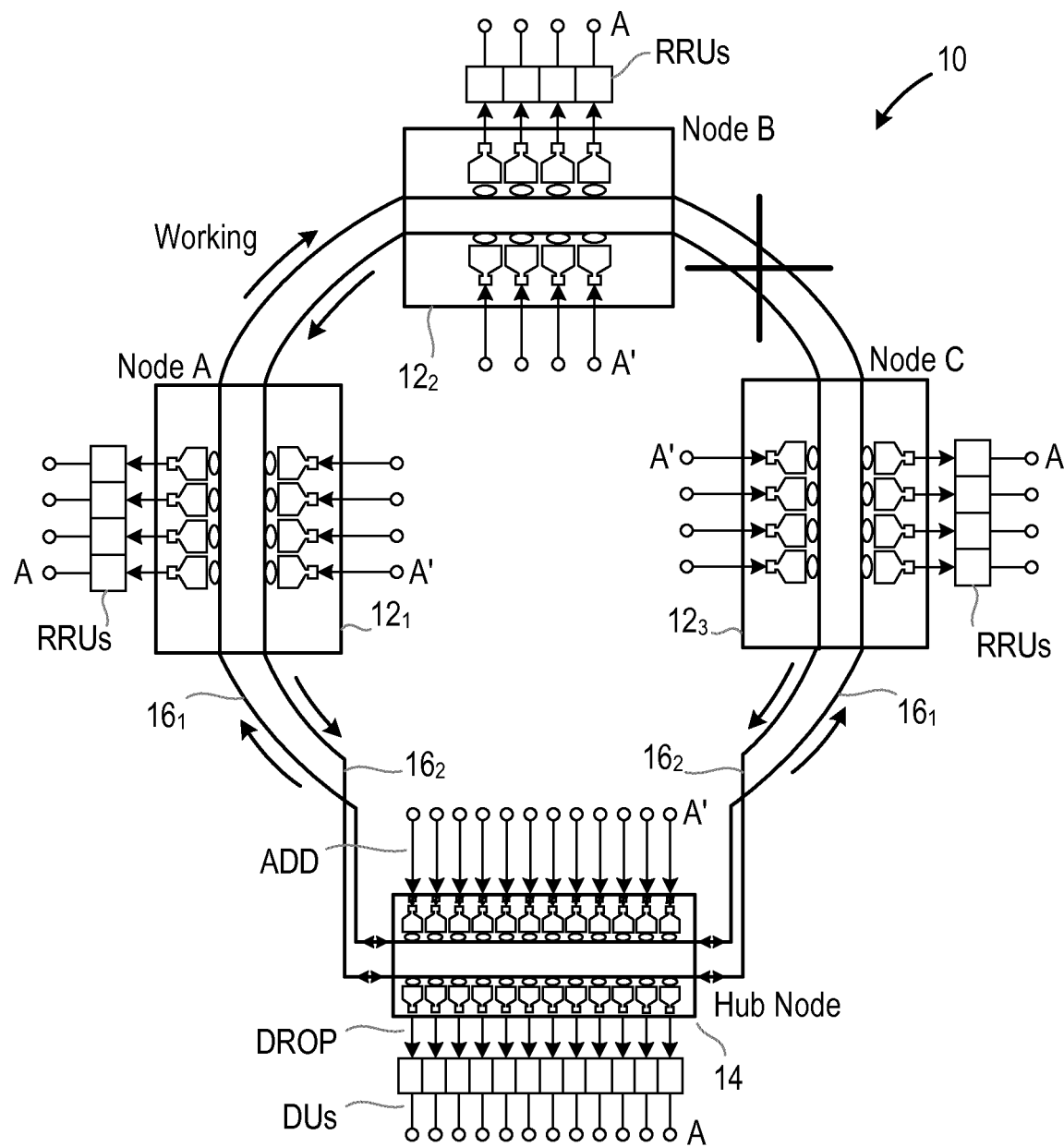
FIG. 2 shows an example of the cluster of RRUs connected in a ring topology network to a hub node with a DU pool of FIG. 1 in a failure scenario.

FIG. 2 illustrates an optical ring network 10 interconnecting three optical add and drop devices $12_1$ to $12_3$ to a WDM Multiplexer/demultiplexer 14 in the hub node, corresponding to FIG. 1. In this example, a failure has occurred in the optical double ring, i.e. a non working condition. In this example, one of the optical links between the add and drop devices has broken, and in particular the optical link between the optical add and drop device $12_2$ and the optical add and drop device $12_3$.

In order to handle this failure, the optical ring network configured to enter a protection mode. In the protection mode, the direction of downstream transmission between the WDM Multiplexer/demultiplexer 14 and the optical add and drop devices $12_1$ and $12_2$ has reversed, i.e. changed to clockwise on the outer ring $16_1$. In a similar way, the upstream transmission between the WDM Multiplexer/demultiplexer 14 and the optical add and drop devices $12_1$ and $12_2$ has also reversed, i.e. changed to anti-clockwise on the inner ring $16_2$. However, for optical add and drop device $12_3$ the directions of the upstream and downstream transmission remains unaltered between a normal mode and a protection mode. In this way, this network 10 is able to cope with a failure to optical links of the double ring network.

Thus, for at least some of the optical add and drop devices ($12_1$, $12_2$) connected to an optical ring, the direction of both the upstream and downstream transmission is reversed. Each of the upstream and downstream transmission remains in their original ring 10, i.e. the ring of optical fiber used for normal working. Thus, the upstream transmission remains on the second (inner) ring, and the downstream transmission remains on the first (outer) ring. This reversal of direction within the same ring is for at least some of the Multiplexer/demultiplexers $12_1$ to $12_3$, in this case only Multiplexer/demultiplexers $12_1$ to $12_2$.

The upstream and downstream transmissions remain in opposite directions. This is in contrast to a protection mode in conventional ring networks in which for some optical add and drop devices, the upstream and downstream transmissions must change the ring (for example from internal to external) to cope with a link failure in the optical ring due to the unidirectional nature of ring transmission.

This protection mode in which both the upstream and downstream transmission are reversed provides for a transmission symmetry to each of the nodes. For example, FIG. 2 shows that for the reversed upstream and downstream transmissions, the distance (and hence time) of transmission between any of the optical add and drop devices is the same upstream and downstream. For fronthaul applications transmitting radio data, e.g. CPRI, there is a strict requirement on timing symmetry in upstream and downstream between a particular RRU and baseband processing digital units DU. The described arrangement provides for such symmetry in normal operation, and in the protection mode.

Aspects provide for a transport network 10 configured to connect one or more digital units with a plurality of remote radio units. The transport network comprises one or more optical links in a ring arrangement. The transport network further comprises a multiplexer/demultiplexer 14 arranged to transmit downstream transmissions from the one or more digital units to the remote radio units and receive upstream transmissions from the remote radio units for the one or more digital unit. The multiplexer/demultiplexer 14 is configured to provide a protection mode, wherein, on determination of a failure in the one or more optical links, a direction of the downstream transmission and a direction of the upstream transmission for at least one of the plurality of remote radio units is reversed.

In some examples, one or more optical add drop multiplexers connects one or more of the remote radio units to a said optical link.

The configuration of the multiplexer/demultiplexer $12_1$ to $12_3$, 14 to carry out this protection mode functionality may be considered as a function or a method implemented in the network 10 or by a controller unit or control system.

In this architecture, if a failure occurs in the WDM Multiplexer/demultiplexer 14 itself or in the cross-connect placed in the hub node, there is no simple recovery mechanism. Hence, there is a single point of failure at the hub node. In order to avoid this single point of failure, the embodiments described herein enable recovery of a hub node.

In one example of a recovery, a duplication of the entire hub node may be provided. However, duplicating the entire hub node 14 can require a large size of switch, and high associated costs, and comprise additional external optical switches for switching between inner and outer rings of an optical network. The embodiments described below provide solutions which allow a failure of the hub node 14 to be recovered, but without duplicating the entire hub node.

Figure 3:
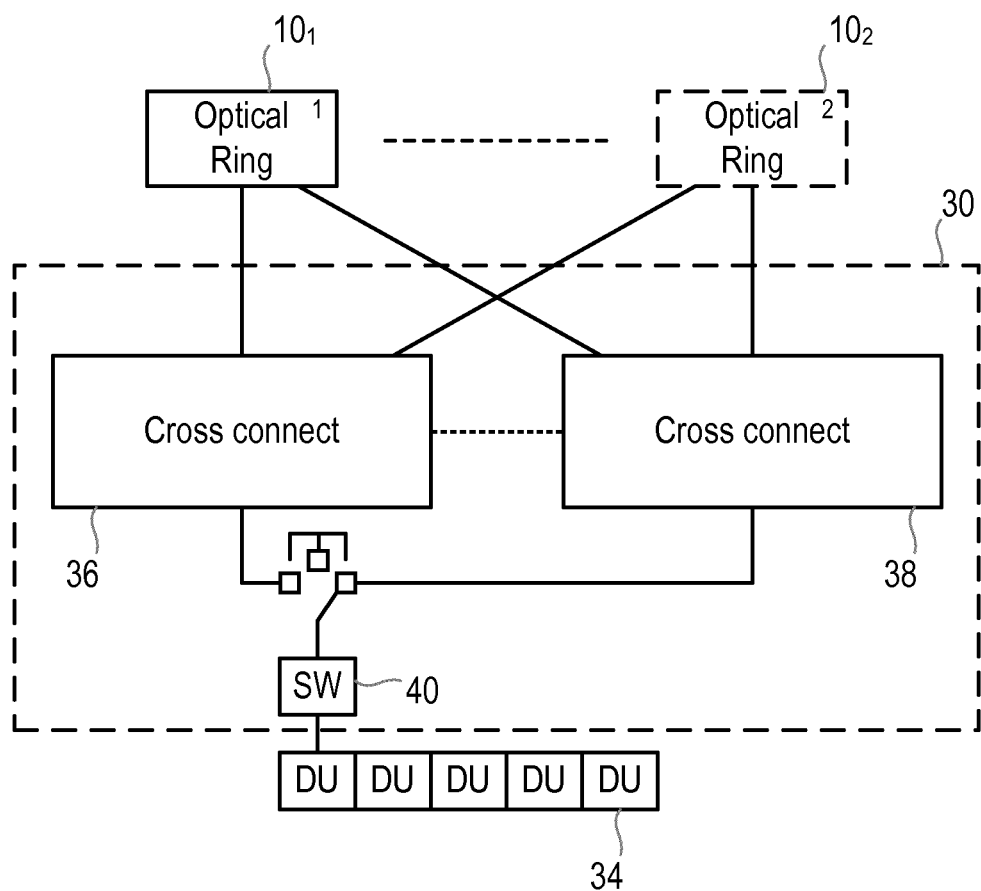
FIG. 3 shows an example of a transport network according to an embodiment.

FIG. 3 illustrates a transport network 30 according to an embodiment of the disclosure.

The transport network 30 is configured to connect one or more optical rings 10 connected to optical add and drop devices. Each optical ring 10 may comprise one or more optical fiber in a ring, for example, as shown and configured in FIGS. 1 and 2. The optical rings may each be double rings. As described above, the optical add and drop devices are connected, for example, to respective clusters of one or more remote radio units, RRU. The optical rings provide a connection of the RRUs with one or more digital units (DUs) 34 in a radio access network.

In some examples, the transport network 30 comprises a first electronic cross-connect 36 and a second electronic cross-connect 38.

The network 30 comprises a switch 40 configured to connect the first electronic cross-connect 36 and/or the second electronic cross-connect 38 to the one or more digital units 34. The switch 40 may be either an electronic switch or an optical switch.

The first and second electronic cross-connects are each coupled to at least one of the one or more optical rings 10 of optical add and drop devices.

In this example both the first electronic cross-connect 36, and the second electronic cross-connect 38 are connected to both a first optical ring $10_1$ and a second optical ring $10_2$.

By providing first and second electronic cross-connects 36, 38 coupled in this manner, a failure in the transport network, for example, in one of the electronic cross-connects 36 or 38 can be reconfigured to allow communication to continue. This arrangement also provides for protection for an optical link failure, as described above. As such, there is no single point of failure at a hub which interconnects, for example, one or more RRUs with one or more DUs.

Figure 4:
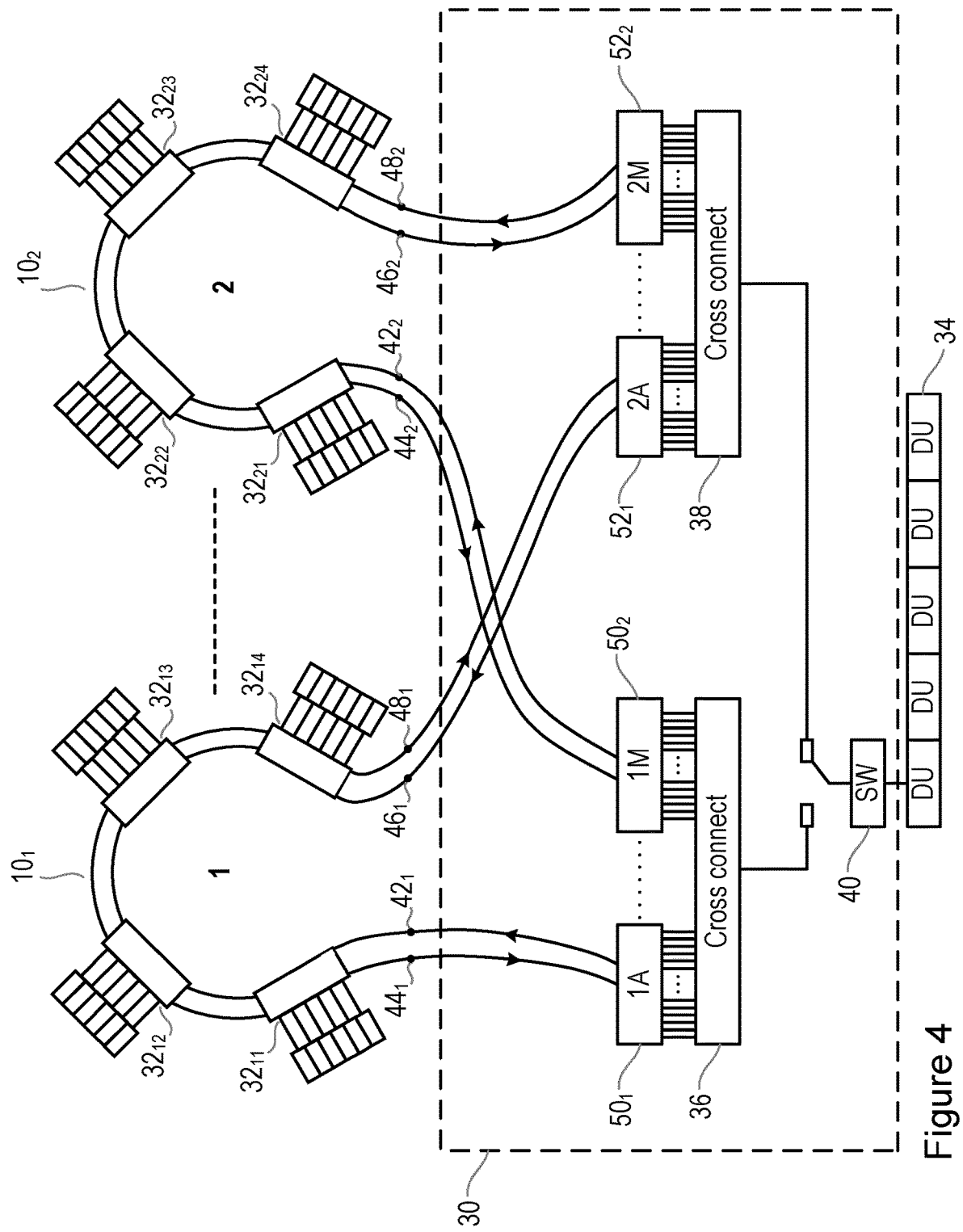
FIG. 4 shows an example of an application of a transport network according to an embodiment.
Figure 5:
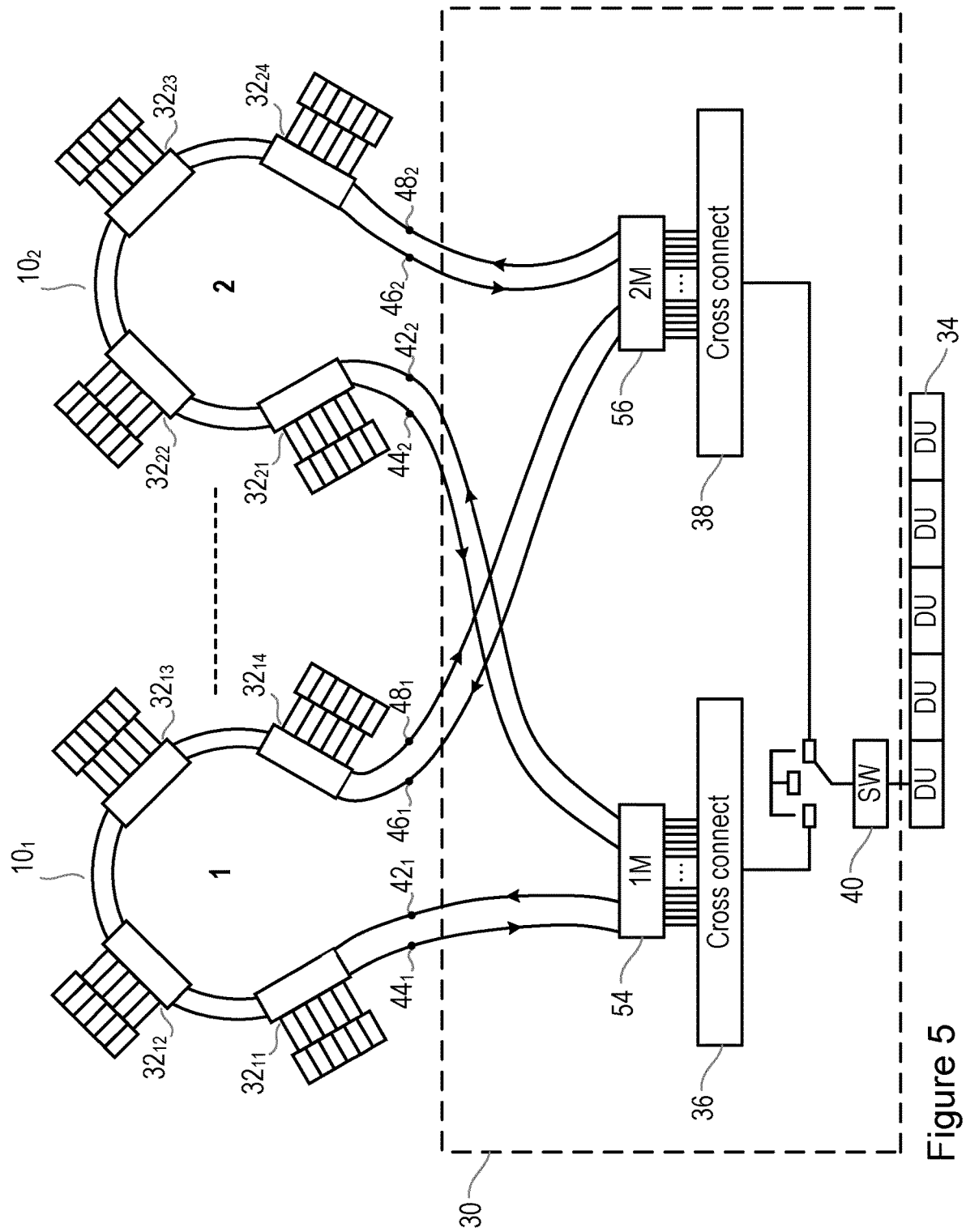
FIG. 5 shows another example of an application of a transport network according to an embodiment.

It will be appreciated that the optical rings of optical add and drop devices, for example coupled to RRU clusters, may be provided with different structures, for example the ring like structures as shown in FIGS. 4 and 5 described below.

In one example the electronic cross-connects may comprise Common Public Radio Interfaces (CPRI) switches.

FIG. 4 illustrates an example of an application of a transport network 30 according to an embodiment. In some aspects, the transport network may be considered as including the optical ring networks 10, optical add and drop devices 32 and hub WDM multiplexer/demultiplexers 50,52. In this example, the optical rings 10 are shown, each comprising a first input 42, a first output 44, a second input 46 and a second output 48.

Two optical rings $10_1$ and $10_2$ are shown in this example, each comprising a plurality of optical add and drop devices 32 connected for example to RRU clusters (each cluster comprising six RRUs in the example). In the example, the optical ring networks $10_1$ and $10_2$ each comprise four optical add and drop devices $32_1$ to $32_4$. However, it will be appreciated that more optical rings 10 may be present, and that different numbers of optical add and drop devices 32 may be present in each optical ring, and a different number of RRUs provided in each cluster.

This optical ring formation is configured such that upstream data travels in an opposite direction to the downstream data within each optical ring. Each optical ring may comprise one or more fibers. The upstream and downstream data may be carried in the same fiber, or in different fibers (or rings). As such, each optical ring 10 may be considered as an optical ring network comprising one or more optical rings.

The transport network 30 comprises a first electronic cross-connect 36 and a second electronic cross-connect 38, and a switch 40 for connecting, in this particular embodiment, either the first electronic cross-connect 36 or the second electronic cross-connect 38 to one or more digital units 34.

A first input 42 is provided on one end of a first loop, for example an inner loop of the double ring formation, and a second input 46 is provided on the other end of the inner loop of the double ring formation.

Similarly, a first output 44 is provided on one end of a second loop, for example an outer loop of the double ring formation, and a second output 48 is provided on the other end of the outer loop of the double ring formation.

It will be appreciated that the inner loop may provide upstream or downstream transmission, and equivalently, the outer loop may provide downstream or upstream transmission respectively. Hence the first and second inputs of each optical ring are provided on the loop which provides downstream data to the optical add and drop devices 32 (and RRUs), and the first and second outputs of each optical ring are provided on the loop which provides the upstream data from the optical add and drop devices 32 (and RRUs).

Thus, according to this embodiment, the transport network comprises a first electronic cross-connect 36 that is coupled to provide downstream and upstream data to a first input 42 and from a first output 44, respectively, of a optical ring (e.g. $10_1$) of optical add and drop devices (e.g. $32_{11}$ to $32_{14}$), and a second electronic cross-connect 38 that is coupled to provide downstream and upstream data to a second input 46 and from a second output 48, respectively, of the optical ring (e.g. $10_1$) of optical add and drop devices (e.g. RRUs $32_{11}$ to $32_{14}$).

The transport network 30, in this embodiment, further comprises a multiplexer/demultiplexer unit 50, 52 for connecting a respective electronic cross-connect 36, 38 to at least two optical rings 10 of optical add and drop devices 32. In the example of FIG. 4, at least two first multiplexer/demultiplexer units 50 are provided. In this particular case two multiplexer/demultiplexer units $50_1$ and $50_2$ are shown connected to the first electronic cross-connect 36. These multiplexer/demultiplexer units 50 are provided for connecting the first electronic cross-connect 36 respectively to the plurality of optical rings $10_1$, to connect to the associated optical add and drop devices 32. In this example, the multiplexer/demultiplexer units 50 connect the first electronic cross-connect 36 to both the optical rings $10_1$ and $10_2$ of optical add and drop devices (which in turn may be connected to RRU clusters).

The multiplexer/demultiplexer unit $50_1$ is illustrated as connecting the first electronic cross-connect 36 to the first optical ring $10_1$ only (e.g. comprising optical add and drop devices $32_{11}$ to $32_{14}$). In particular, the upstream data is connected to be received by the multiplexer/demultiplexer $50_1$ from the first output $44_1$ of the first optical ring $10_1$. The downstream data is connected to be sent by the multiplexer/demultiplexer $50_1$ to the first input $42_1$ of the first optical ring $10_1$.

The multiplexer/demultiplexer unit $50_2$ is illustrated as connecting the first electronic cross-connect 36 to the second optical ring $10_2$ only (e.g. comprising optical add and drop devices $32_{21}$ to $32_{24}$). In particular the upstream data is connected to be received by the multiplexer/demultiplexer unit $50_2$ from the first output $44_2$ of the second optical ring $10_2$. The downstream data is connected to be sent by the multiplexer/demultiplexer $50_2$ to the first input $42_2$ of the second optical ring $10_2$.

If more than two optical rings are present, further multiplexers/demultiplexer units 50 may be provided to connect the first electronic cross-connect 36 to each of the optical rings that are present.

At least two second multiplexer/demultiplexer units 52 are also provided in this embodiment. In this particular case, two multiplexer/demultiplexer units $52_1$ and $52_2$ are shown associated with the second electronic cross-connect. These multiplexer/demultiplexer units $52_1$ and $52_2$ are provided for connecting the second electronic cross-connect 38 respectively to the optical rings 10 of optical add and drop devices 32. In this example, the multiplexer/demultiplexer units 52 connect the second electronic cross-connect 38 to both the optical rings $10_1$ and $10_2$.

The multiplexer/demultiplexer unit $52_1$ is illustrated as connecting the second electronic cross-connect 38 to the first optical ring $10_1$. (e.g. comprising optical add and drop devices $32_{11}$ to $32_{14}$). In particular, the upstream data is connected to be received by the multiplexer/demultiplexer $52_1$ from the second output $48_1$ of the first optical ring $10_1$. The downstream data is connected to be sent by the multiplexer/demultiplexer $52_1$ to the second input $46_1$ of the first optical ring $10_1$.

The multiplexer/demultiplexer unit $52_2$ is illustrated as connecting the second electronic cross-connect 38 to the second optical ring $10_2$ (e.g. comprising optical add and drop devices $32_{21}$ to $32_{24}$). In particular the upstream data is connected to be received by the multiplexer/demultiplexer unit $52_2$ from the second output $48_2$ of the second optical ring $10_2$. The downstream data is connected to be sent by the multiplexer/demultiplexer $52_2$ to the second input $46_2$ of the second optical ring $10_2$.

If more than two optical rings are present, further multiplexers/demultiplexer units 52 may be provided to connect the second electronic cross-connect 38 to each of the optical rings that are present.

As mentioned above, a switch 40 is provided to connect either the first electronic cross-connect 36 or the second electronic cross-connect 38 to the one or more digital units 34.

The direction of travel of upstream data within the optical rings is therefore dependent on whether the digital units are connected by the switch 40 to the first electronic cross-connect 36 or the second electronic cross-connect 38.

For example, if the first electronic cross-connect 36 is connected to the digital units 34, the following data direction through the optical rings 10 of optical add and drop devices 32 will apply.

The upstream data through the first optical ring $10_1$ (comprising optical add and drop devices $32_{11}$ to $32_{14}$) will travel in an anti-clockwise direction, for example on the outer ring in this example, and will be coupled via the first output $44_1$ of the first optical ring $10_1$ to the first multiplexer/demultiplexer $50_1$ of the first cross-connect 36. As such, any data that is added by the add and drop devices $32_{11}$ to $32_{14}$ will flow anti-clockwise around the ring (e.g. outer ring), via the first output $44_1$ of the first optical ring $10_1$ to the first multiplexer/demultiplexer $50_1$ of the first electronic cross-connect 36, and via switch 40 to the one or more DUs 34.

The downstream data through the first ring $10_1$ of RRU clusters will travel in a clockwise direction, for example on the inner ring in this example. In particular, downstream data from DUs 34 which is received via switch 40 by the first electronic cross-connect 36 will be coupled via the first multiplexer/demultiplexer $50_1$ to the first input $42_1$ of the first optical ring $10_1$. As such, any downstream data sent from the first multiplexer/demultiplexer $50_1$ to the first input $42_1$ of the first optical ring $10_1$ will travel in a clockwise manner around the ring (e.g. the inner ring), with respective wavelengths being dropped by the optical add and drop devices $32_{11}$ to $32_{14}$ as appropriate.

When the switch 40 is connected to the first cross-connect 36 as described above, upstream and downstream data will be received from, and sent to the second optical ring $10_2$ (comprising add and drop devices $32_{21}$ to $32_{24}$, for example connected to RRU clusters) in a similar manner to that described above, but via a second multiplexer/demultiplexer $50_2$.

It is noted that the use of the inner and outer rings can be changed without affecting the operation of the embodiment.

In the event that a failure occurs in the first electronic cross-connect 36, the switch 40 can be switched to connect the second electronic cross-connect 38 to the digital units 34. As will be explained below, upstream and downstream data can still flow between a cluster of RRUs and the DUs, but in an opposite direction within each add and drop device.

For example, when the switch 40 is coupled to the second electronic cross-connect 38, the upstream data through the first optical ring $10_1$ of optical add and drop devices $32_{11}$ to $32_{14}$ will travel in a clockwise direction. In other words, data added by each of the optical add and drop devices $32_{11}$ to $32_{14}$ will travel clockwise (on the outer ring in this example) via the second output $48_1$ of the first optical ring $10_1$, and via the first multiplexer/demultiplexer unit $52_1$ of the second electronic cross-connect 38, through the switch 40 to the DUs 34.

When the switch 40 is coupled in this manner to the second electronic cross-connect 38, the downstream data through the first optical ring $10_1$ of optical add and drop devices $32_{11}$ to $32_{14}$ will travel in an anti-clockwise direction. In other words, data to be dropped via each of the optical add and drop devices $32_{11}$ to $32_{14}$ is sent from the second electronic cross-connect 38 via the first multiplexer/demultiplexer unit $52_1$ to the second input $46_1$ of the first optical ring $10_1$, and will travel anti-clockwise (on the inner ring in this example), such that data can be dropped at the appropriate optical add and drop devices $32_{11}$ to $32_{14}$.

In a similar manner, when the switch 40 is switched to connect the second electronic cross-connect 38 to the DUs, the upstream data through the second optical ring $10_2$ of optical add and drop devices $32_{21}$ to $32_{24}$ will travel in a clockwise direction (on the inner ring in this example). The downstream data through the second optical ring $10_2$ will travel in an anti-clockwise direction (on the outer ring in this example).

It will be appreciated that the connections to the first and second input and output ports of both optical rings 10 could be configured such that the direction of upstream data travel in each optical ring 10 is different from the other regardless of which electronic cross-connect is connected to the digital units 34.

From the above it can be seen that this embodiment enables a failure at the cross-connect level to be circumvented by switching the switch 40 to connect a different electronic cross-connect 36/38 to the plurality of DUs. Should a failure occur to one of the links within an optical ring, it will be appreciated that the first and second electronic cross-connects 36, 38 can still be used to add or drop data, for example to the RRUs, by switching the switch 40 as appropriate.

Each electronic cross-connect may comprise, for example, a CPRI switch.

It is noted that, if the example of FIG. 4 were configured such that each of the four add and drop devices $32_{11}$ to $32_{14}$ were configured to add/drop four wavelengths each, then each multiplexer/demultiplexer 50 can be configured to handle at least 16 wavelengths in this example. Other numbers of add and drop devices may be used, and other numbers of wavelengths per add and drop device and multiplexer/demultiplexer.

FIG. 5 illustrates another example of an application of a transport network according to another embodiment. In this example the optical rings 10 are shown with a first input 42, a first output 44, a second input 46 and a second output 48. Again two optical rings are shown in this example, $10_1$ and $10_2$. However, it will be appreciated that more optical rings could be present.

This ring formation is configured such that upstream data travels in an opposite direction to the downstream data within each optical ring.

The first input 42 is provided on one end of a first loop, for example the inner loop of the double ring formation, and the second input 46 is provided on the other end of the inner loop of the double ring formation.

Similarly, the first output 44 is provided on one end of a second loop, for example the outer loop of the double ring formation, and the second output 48 is provided on the other end of the outer loop of the double ring formation.

It will be appreciated that the inner loop may provide upstream or downstream transmission, and equivalently, the outer loop may provide downstream or upstream transmission respectively. Hence the first and second inputs are provided on the loop which provides downstream data to the optical add and drop devices 32 (connected for example to RRUs), and the outputs of the optical add and drop devices (and for example RRUs) are provided on the loop which provided the upstream data to the digital units.

In a similar manner to FIG. 4, the transport network 30 comprises a first electronic cross-connect 36 and a second electronic cross-connect 38, and a switch 40 for connecting, in this particular embodiment, the first electronic cross-connect 36 and/or the second electronic cross-connect 38 to one or more digital units.

The transport network 30, in this embodiment, comprises a first multiplexer/demultiplexer unit 54. This multiplexer/demultiplexer unit 54 is provided for connecting the first electronic cross-connect 36 to a plurality of optical rings 10 of optical add and drop devices 32. In this example, the multiplexer/demultiplexer unit 54 connects the first electronic cross-connect 36 to first and second optical rings $10_1$ and $10_2$.

The multiplexer/demultiplexer unit 54 is illustrated as connecting the first electronic cross-connect 36 to the optical rings $10_1$ and $10_2$ (e.g. comprising optical add and drop devices $32_{11}$ to $32_{14}$ and $32_{21}$ to $32_{24}$, respectively, with each coupled for example to a RRU cluster). In particular, the upstream data of the first optical ring $10_1$ is connected to be received by the multiplexer/demultiplexer 54 from the first output $44_1$ of the first optical ring $10_1$, for example via the outer ring of the first optical ring $10_1$. The downstream data of the first optical ring $10_1$ is connected to be sent by the multiplexer/demultiplexer 54 to the first input $42_1$ of the first optical ring $10_1$.

The upstream data of the second optical ring 102 is connected to be received by the multiplexer/demultiplexer unit 54 from the first output $44_2$ of the second optical ring $10_2$. The downstream data is connected to be sent by the multiplexer/demultiplexer 54 to the first input $42_2$ of the second optical ring $10_2$.

A second multiplexer/demultiplexer unit 56 is also provided in this embodiment. This multiplexer/demultiplexer unit 56 is provided for connecting the second electronic cross-connect 38 respectively to the optical rings 10 of optical add and drop devices (for example coupled to RRU clusters). In this example, the multiplexer/demultiplexer unit 56 connects the second electronic cross-connect 38 to the first and second optical rings $10_1$ and $10_2$.

In particular, the upstream data of the first optical ring $10_1$ is connected to be received by the multiplexer/demultiplexer 56 from the second output $48_1$ of the first optical ring $10_1$. The downstream data of the first optical ring $10_1$ is connected to be sent by the multiplexer/demultiplexer 56 to the second input $46_1$ of the first optical ring $10_1$.

The upstream data of the second optical ring $10_2$ is connected to be received by the multiplexer/demultiplexer unit 56 from the second output $46_2$ of the second optical ring $10_2$. The downstream data of the second optical ring $10_2$ is connected to be sent by the multiplexer/demultiplexer 56 to the second input $48_2$ of the second optical ring $10_2$.

In this example, a sub-set of wavelengths, for example half of the wavelengths, for each optical ring 10 are connected through the multiplexer/demultiplexer 54 and the other sub-set (e.g. half) of the wavelengths are connected through the multiplexer/demultiplexer 56. Therefore, within each optical ring 10 some of the wavelengths will travel upstream in a first direction and the other wavelengths will travel upstream in the opposite direction.

If more than two rings are present, the number of wavelengths available for use in each multiplexer/demultiplexer, and the number of optical add and drop devices in each optical ring 10 (or the number of wavelengths used by each add/drop device, or the number of RRUs in each optical ring 10) may determine the number of rings which can be connected to each multiplexer/demultiplexer. For example, in one embodiment the multiplexers/demultiplexer units 54 and 56 may connect the first and second electronic cross-connects 36 and 38 to all of the optical rings 10 that are present. In another example, additional multiplexer/demultiplexer units may be provided per electronic cross-connect.

As mentioned above, a switch 40 is provided to connect the first electronic cross-connect 36 and/or the second electronic cross-connect 38 to the digital units 34.

The direction travel of upstream data within each optical ring 10 is therefore dependent on whether the digital units are connected by the switch 40 to the first electronic cross-connect 36 or the second electronic cross-connect 38.

If the first electronic cross-connect 36 is connected to the digital units 34, the following data direction through the optical ring 10 of optical add and drop devices 32 will apply.

The upstream data through the first optical ring $10_1$ will travel in an anti-clockwise direction, for example on the outer ring in this example, and exit the first output $44_1$ of the first optical ring $10_1$. The downstream data through the first optical ring $10_1$ will travel in a clockwise direction, on the inner ring in this example, and enter via the first input $42_1$ of the first optical ring $10_1$. The upstream data through the second optical ring $10_2$ will travel in an anti-clockwise direction, again on the outer ring in this example, and exit the first output $44_2$ of the second optical ring $10_2$. The downstream data through the second optical ring $10_2$ will travel in a clockwise direction, again on the inner ring in this example, and enter via the first input $42_2$ of the second optical ring $10_2$.

If the second electronic cross-connect 38 is connected to the digital units 34, the following data direction through the optical rings 10 of optical add and drop devices 32 will apply.

When the second electronic cross-connect 38 is connected, the upstream data through the first optical ring $10_1$ will travel in a clockwise direction, for example on the outer ring in this example, and exit the second output $48_1$ of the first optical ring $10_1$. The downstream data through the first optical ring $10_1$ will travel in an anti-clockwise direction, on the inner ring in this example, and enter via the second input $46_1$ of the first optical ring $10_1$. The upstream data through the second optical ring $10_2$ will travel in a clockwise direction, on the inner ring in this example, and exit the second output $46_2$ of the second optical ring $10_2$. The downstream data through the second optical ring $10_2$ will travel in an anti-clockwise direction, on the outer ring in this example, and enter via the second input $48_2$ of the second optical ring $10_2$.

It is noted that, differently from the embodiment of FIG. 4 in which the second cross-connect 38 is in stand-by during normal operation, in the embodiment of FIG. 5 the second electronic cross-connect 38 is active and connected during a normal working mode, alongside the first cross-connect 36, This is because a first sub-set (e.g. half) of the wavelengths in an optical ring can be handled by a first cross-connect (for example cross-connect 36) while the rest can be handled by the second cross-connect (for example cross-connect 38). Further details about the operation of the embodiment of FIG. 5 will be provided later. The switch 40 may be considered as connecting both the first and second cross-connects to the DUs in normal operation. The first and second cross-connects may be connected to the DUs simultaneously (concurrently) or consecutively.

It will be appreciated that the connections to the first and second input and output ports of both optical rings 10 could be configured such that the direction of upstream data travel in each of the optical rings 10 is different from the other regardless of which electronic cross-connect is connected to the digital units 34.

The coupling between the electronic cross-connects 36, 38 and the optical rings 10 of optical add and drop devices 32 are in some embodiments optical links. The multiplexer/demultiplexer units may comprise a reconfigurable optical add/drop multiplexer, ROADM.

In one embodiment, by utilising the same multiplexer/demultiplexer on each electronic cross-connect to connect to both the optical rings, the number of optical ROADM (based on silicon photonics) or passive components in the transport network can be reduced The multiplexer/demultiplexer units, in both FIGS. 4 and 5, have the function of multiplexing/demultiplexing the wavelength channels to be sent and to be received from the network The electronic cross-connect switches 36 and 38 may comprise a common public radio interface, CPRI, switch.

Figure 6:
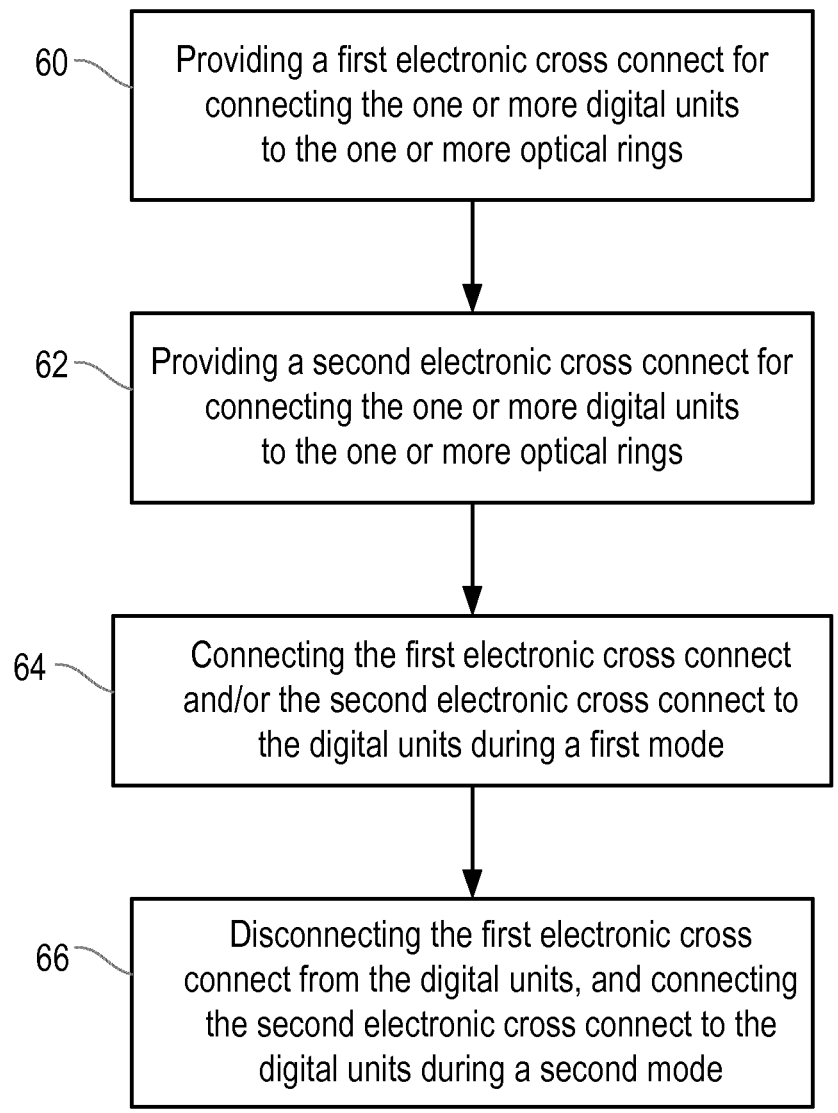
FIG. 6 shows an example of a method according to an embodiment.

FIG. 6 is a flowchart illustrating a method of operating a transport network 30, according to another embodiment. The transport network 30 may be configured as described in any one of FIG. 3, 4 or 5. Aspects of the disclosure are also applicable to alternative embodiments of suitable transport networks.

In step 60, a first (e.g. electronic) cross-connect in provided for connecting one or more digital units to one or more optical rings.

The first electronic cross-connect may be coupled to provide downstream and upstream data to a first input and from a first output, respectively, of an optical ring.

In step 62, a second electronic cross-connect is provided for connecting the one or more digital units to the one or more optical rings.

The second electronic cross-connect may be coupled to provide downstream and upstream data to a second input and from a second output, respectively, of the optical ring In step 64, the first electronic cross-connect and/or second electronic cross connect is connected to the digital units during a first mode, and in step 66, the first electronic cross-connect is disconnected from the digital units, and the second electronic cross-connect is connected to the digital units during a second mode.

In one embodiment, when the method of FIG. 6 is used in an arrangement as shown in the example of FIG. 4, the first mode may comprise a working (or normal) mode, and the second mode may comprise a protection mode, for example if a failure occurs, such as a failure to the first electronic cross-connect 36.

According to one example of the method, the optical add and drop devices may be provided in a ring formation such that upstream data travels in an opposite direction to downstream data within the ring of optical add and drop devices.

The first input may be provided on one end of a first loop, for example the inner loop, of the double ring formation, and the second input may be provided on the other end of the inner loop of the double ring formation.

Similarly, the first output may be provided on one end of a second loop, for example the outer loop of the double ring formation, and the second output may be provided on the other end of the outer loop of the double ring formation.

This allows the direction of the propagation of the upstream and downstream transmissions in the optical add and drop devices (and RRU clusters connected thereto) to be swapped. For example, if the digital units are connected to the first electronic cross-connect, upstream data will propagate in each cluster of remote radio units in a first direction, and if the digital units are connected to the second electronic cross-connect upstream data will propagate in each cluster of remote radio units in a different direction to the first direction.

Therefore, if a failure occurs in an optical link between two of the optical add and drop devices in an optical loop in one of the optical rings, the switching between the electronic cross-connects allows the upstream data to propagate in a different direction, alleviating the failure as described in FIG. 2.

However, contrary to FIG. 2, as there are first and second electronic cross-connects, if a failure occurs in one of the electronic cross-connects, or in one of the multiplexer/demultiplexer units shown in FIGS. 4 and 5, by switching to the other electronic cross-connect this failure can also be overcome. In FIG. 2, as there is only one hub node with a signal multiplexer, if a failure occurs in this hub node, there is no way to alleviate the problem quickly without disrupting ongoing transmissions.

When the direction is inverted due to a fault in an optical connection between the individual RRU clusters in an optical ring, protection switching must be activated within the isolated optical add and drop device connected to the RRU cluster so as to invert the direction of add and drop sites of that particular RRU cluster.

When the direction is inverted due to a fault in the electronic cross-connect or multiplexer/demultiplexer protection switching of the RRU clusters which will now be reconnected to the other electronic cross-connect.

To perform steps 64 and 66, at least two alternative embodiments are possible. In a first embodiment at least two first multiplexer/demultiplexer units are provided for connecting the first electronic cross-connect respectively to at least two optical rings. At least two second multiplexer/demultiplexer units are provided for connecting the second electronic cross-connect respectively to at least two optical rings.

As described above with reference to FIG. 4, these multiplexer/demultiplexer units may be connected to the first and second inputs and outputs of the optical rings.

In a second embodiment, a first multiplexer/demultiplexer unit is provided for connecting the first electronic cross-connect to a plurality of optical rings; and a second multiplexer/demultiplexer unit is provided for connecting the second electronic cross-connect to a plurality of optical rings.

As described above with reference to FIG. 5, these multiplexer/demultiplexer units may be connected to the first and second inputs and outputs of the optical ring.

In an example where a first multiplexer/demultiplexer unit is provided for connecting the first electronic cross-connect to a plurality of optical rings, and a second multiplexer/demultiplexer unit is provided for connecting the second electronic cross-connect to a plurality of optical rings, the method may comprise during the first mode, using the first multiplexer/demultiplexer unit for handling a first sub-set of wavelengths between the first electronic cross-connect and a first optical ring, and a second sub-set of wavelengths between the first electronic cross-connect and a second optical ring. Also during this first mode, the method may comprise using the second multiplexer/demultiplexer unit for handling a third sub-set of wavelengths between the second electronic cross-connect and the first optical ring, and a fourth sub-set of wavelengths between the second electronic cross-connect and the second optical ring.

In such an embodiment, during the second mode the method may comprise using the first multiplexer/demultiplexer unit for handling a first sub-set of wavelengths between the first electronic cross-connect and the first optical ring, and a third sub-set of wavelengths between the first electronic cross-connect and the first optical ring.

The method may further comprise, during the first mode, operating a multiplexer/demultiplexer unit to handle low priority traffic on one or more wavelengths reserved as protection paths for high priority traffic. The method may comprise, during the second mode, operating a multiplexer/ demultiplexer unit to handle additional high priority traffic on one or more wavelengths reserved as protection paths for other high priority traffic.

In one example, each multiplexer/demultiplexer may have four line ports, two in one direction, and two in an opposite direction. A multiplexer/demultiplexer may comprise a ROADM, and the four line ports of each ROADM can multiplex/demultiplex any combination of wavelengths in one direction (e.g. west) while the rest of the wavelengths are multiplexed/demultiplexed in the opposite direction (east).

In the embodiment where multiple multiplexer/demultiplexer units are provided on each cross-connect, the extra line ports are used to provide protection for all of the wavelengths being used by the other two ports, which are connected to the RRUs. In general in all the embodiments there are multiple multiplexers/demultiplexers per each cross-connect because many rings are present. The difference is that in one embodiment (FIG. 4) the multiplexer/demultiplexer are duplicated at the cross-connect and only one is working, the other is in stand-by unless a link failure or a cross-connect failure occurs. In FIG. 5 instead, even in normal mode the two multiplexers/demultiplexers and cross-connects are active. In case of link or cross-connect failure the low priority wavelength are discarded to leave capacity for the high priority wavelength, as mentioned above.

In embodiments where only a single multiplexer/demultiplexer unit is provided for each electronic cross-connect, such as the embodiment of FIG. 5, all 4 line ports may be utilised to connect each electronic cross-connect to both optical rings. Therefore, there are no reserved wavelengths for protection.

Therefore, during a working mode of operation where no fault has occurred, low priority traffic may be processed on one or more wavelengths which are otherwise reserved as protection paths for high priority traffic.

If a fault occurs the low priority traffic may be disrupted in order to utilise the reserved wavelengths to protect the high priority traffic.

High priority and low priority traffic can be classified according the type of service to be supported. This could either be information that is associated by contract with the operators of the user producing the traffic, or something that can be user dependent.

A control function for the transport network can receive any information relating to the classification of particular traffic in order to determine whether the traffic should be disrupted during protection mode.

If a fault occurs, the control function for the transport network is notified about the failure event, and it reconfigures the transport network to allow the high priority traffic to be protected.

Thus, in an example using ROADMs, exploiting the two directions of the ROADMs, it is possible to offer two different classes of services without wasting resources: i) traffic that is guaranteed also in case of failure and ii) traffic that is not guaranteed in case the network has not enough resources. In the working phase half of the resources that are configured as protection are not used, thus it is possible to assign them to the traffic that does not require recovery after failure (e.g. low class of service). In case of a fault, the low class of service traffic is pre-empted or moved to make available such resource, which can be assigned to the high class of service traffic. This dynamic handling can be performed by the control plane of the fronthaul network that is aware of the network status, the failure events and the traffic features. Any ROADM may be implemented as a miniROADM, e.g. operating in two directions, or implemented in an integrated photonics chip, and/or using microring resonators to add and drop wavelengths. Aspects of the disclosure may refer to connecting optical add and drop devices (32) to the DUs, or alternatively, refer to connecting one or more RRUs to the DUs.

For example, such an embodiment may be used with slave eNB RRUs, for example as described in 3GPP Technical Specification TS 36.842 (Study on Small Cell Enhancements for E-UTRA/RAN), such that if backhauling capacity allows, secondary/small cells used to boost capacity are front hauled via the low priority path, whilst overlapping macro/master eNB RRUs (again as per TS 36.842) implementing the control plane and point of presence towards the rest of the network are front hauled via the protected/prioritized path. In case the protected path needs to be relocated it will appropriate the resources used by the slave eNB RRUs. An example of another application is where the wavelengths carry a mixture of protected LTE/5G traffic whilst the unprotected path carries best effort WiFi traffic. Here, similar schemes can then be envisaged if the protected path needs resource relocation. Another application is where standard LTE runs over the protected path and LTE-carrier aggregation or LTE-License Assisted runs in the other.

It is noted that whether to classify individual radio access points as part of the protected or unprotected portion of the network can also be configured dynamically, e.g. based on current or historical load. In such cases, protected remote radio units can be gracefully migrated to the protected path, and vice versa for the unprotected radio units.

This solution allows for a reduction in the size of the electronic cross-connects, reducing the amount of hardware components which need to be utilized and simplifying the failure detection and recovery mechanism.

The transport networks described in the embodiments herein may form part of a Front Haul network, and may comprise multiplexer/demultiplexer units having optical components in the form of ROADMs based on silicon photonics.

Embodiments described herein may be used to provide protection in a double ring front-haul network while guaranteeing the necessary symmetry in the down-stream and up-stream optical paths. This may be obtained by inverting the propagation directions of both communication streams concurrently.

In some of the examples described herein, for example the embodiment of FIG. 4, this provides a 1+1 protection mechanism and can be used whatever technology is used for optical components (e.g. ROADM or multiplexer/demultiplexer). In this case a CPRI switch, for example, and ROADM/Optical multiplexer/demultiplexer are duplicated and each of them closes a part of the ring. In each ROADM (optical multiplexer/demultiplexer) half of the lambdas can be dedicated to working and half to protection paths. The CPRI switch can guarantee that any RRU clusters can be connected to any DU.

In other examples, such as the embodiment of FIG. 5, the transport network can be used with ROADMs and exploit the capability of such devices to multiplex/demultiplex any combination of wavelengths in one direction (i.e. west) while the rest of the wavelengths are multiplexed/demultiplexed in the opposite direction (east). In such an example the transport network can be configured such that a set of wavelengths, e.g. half of the wavelengths, are provided to different rings. In normal operation (i.e. when no faults occurs) the set of wavelengths for protection are assigned to low priority traffic. In the case of faults, such subset of wavelengths are assigned to traffic that requires protection, while the traffic with low priority for contract is pre-empted. This mechanism of resources sharing to support different classes of service can be managed by the control of the fronthaul networks that dynamically performs the node configuration, for example according to a contract and/or operator policy.

The embodiments described above have an advantage of providing both protection against link failure in an optical ring and protection against hub failure. In a conventional architecture to protect against link failure, due to the fact that the communication in the internal and external rings is always in the same direction, either in working mode or in protection mode, external optical protection switches are needed at each optical add and drop device to allow the signal of affected add and drop devices to change the ring to which downstream and upstream has to propagate. For conventional hub node protection (having a cross-connect and a multiplexer/demultiplexer) additional optical protection switches are also needed to allow connecting the optical ring to one multiplexer/demultiplexer or to its duplication. However, the embodiments described herein have the advantage of being simpler, because the multiplexer/demultiplexer and the optical add and drop devices can change the upstream and downstream direction, and because the optical ring is directly connected to the two duplicated multiplexers/demultiplexers, thereby avoiding the need to have external optical switches for switching between different rings.

It should be noted that the above-mentioned embodiments illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A transport network configured to connect one or more optical rings of optical add and drop devices with one or more digital units in a radio access network, the transport network comprising:
    a first electronic cross-connect, wherein the first electronic cross-connect is coupled to provide downstream and upstream data to a first input and from a first output, respectively, of an optical ring of the one or more optical rings, wherein each of the one or more optical rings is a double ring to provide the downstream and upstream data through respective rings of the double ring;
    a second electronic cross-connect, wherein the second electronic cross-connect is coupled to provide downstream and upstream data to a second input and from a second output, respectively, of the optical ring;
    a switch to connect the first electronic cross-connect and the second electronic cross-connect, to the one or more digital units, wherein the first electronic cross-connect and the second electronic cross-connect are switched to couple to at least one of the one or more optical rings of the optical add and drop devices; and
    a first and second multiplexer/demultiplexer unit to connect the respective first and second electronic cross-connects to at least two optical rings of the optical add and drop devices, wherein the first electronic cross-connect is connected to the one or more digital units during a first mode, and wherein during the first mode, the first multiplexer/demultiplexer unit is used to handle a first sub-set of wavelengths between the first electronic cross-connect and a first optical ring, and a second sub-set of wavelengths between the first electronic cross-connect and a second optical ring; and the second multiplexer/demultiplexer unit is used to handle a third sub-set of wavelengths between the second electronic cross-connect and the first optical ring, and a fourth sub-set of wavelengths between the second electronic cross-connect and the second optical ring; and wherein during a second mode, the first electronic cross-connect is disconnected from the one or more digital units, and the second electronic cross-connect is connected to the one or more digital units.

2. The transport network as claimed in claim 1, wherein the one or more optical rings of the optical add and drop devices are provided in a ring formation such that the upstream data travels in an opposite direction to the downstream data, within a respective optical ring.

3. The transport network as claimed in claim 2, wherein a direction of travel of the upstream data within the respective optical ring is dependent on whether the one or more digital units are connected to the first electronic cross-connect or the second electronic cross-connect, and wherein the direction of the travel of the upstream data is one of a clockwise direction or an anticlockwise direction.

4. The transport network as claimed in claim 1, wherein the optical add and drop devices are coupled to clusters of remote radio units (RRUs).

5. The transport network as claimed in claim 1, wherein each of the first and second multiplexer/demultiplexer units comprises a reconfigurable optical add/drop multiplexer (ROADM).

6. The transport network as claimed in claim 1, wherein the first electronic cross-connect and the second electronic cross-connect comprise a common public radio interface (CPRI) switch.

7. A method for connecting one or more optical rings of optical add and drop devices with one or more digital units in a radio access network, the method comprising:
    providing a first electronic cross-connect for connecting the one or more digital units to the one or more optical rings, wherein the first electronic cross-connect is coupled to provide downstream and upstream data to a first input and from a first output, respectively, of an optical ring of the one or more optical rings, wherein each of the one or more optical rings is a double ring to provide the downstream and upstream data through respective rings of the double ring;
    providing a second electronic cross-connect for connecting the one or more digital units to the one or more optical rings, wherein the second electronic cross-connect is coupled to provide downstream and upstream data to a second input and from a second output, respectively, of the optical ring;
    providing a first and second multiplexer/demultiplexer unit for connecting the respective first and second electronic cross-connects to at least two optical rings of the optical add and drop devices;
    connecting the first electronic cross-connect to the one or more digital units during a first mode, wherein during the first mode, the method further comprises:
        using the first multiplexer/demultiplexer unit for handling a first sub-set of wavelengths between the first electronic cross-connect and a first optical ring, and a second sub-set of wavelengths between the first electronic cross-connect and a second optical ring; and using the second multiplexer/demultiplexer unit for handling a third sub-set of wavelengths between the second electronic cross-connect and the first optical ring, and a fourth sub-set of wavelengths between the second electronic cross-connect and the second optical ring; and disconnecting the first electronic cross-connect from the one or more digital units, and connecting the second electronic cross-connect to the one or more digital units during a second mode.

8. The method as claimed in claim 7, wherein the optical add and drop devices are provided in a ring formation such that the upstream data travels in an opposite direction to the downstream data within a ring of the optical add and drop devices.

9. The method as claimed in claim 8, wherein:
when the one or more digital units are connected to the first electronic cross-connect, the upstream data of the first electronic cross-connect propagates in each optical add and drop device in a first direction, and
when the one or more digital units are connected to the second electronic cross-connect, the upstream data of the second electronic cross-connect propagates in each optical add and drop device in a direction different than the first direction.

10. The method as claimed in claim 7, further comprising:
during the second mode:
using the first multiplexer/demultiplexer unit for handling the first sub-set of wavelengths between the first electronic cross-connect and the first optical ring, and a different sub-set of wavelengths between the first electronic cross-connect and the first optical ring.

11. The method as claimed in claim 10, further comprising:
during the first mode, operating one of the first and second multiplexer/demultiplexer units to handle low priority traffic on one or more wavelengths reserved as protection paths for high priority traffic.

12. The method as claimed in claim 7, wherein the first mode comprises a working mode and the second mode comprises a protection mode.

* * * * *